(12) United States Patent
Mitchell et al.

(10) Patent No.: US 7,227,737 B2
(45) Date of Patent: Jun. 5, 2007

(54) ELECTRODE DESIGN

(75) Inventors: Porter Mitchell, San Diego, CA (US); Xiaomei Xi, Carlsbad, CA (US); Linda Zhong, San Diego, CA (US); Bin Zou, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 175 days.

(21) Appl. No.: 10/974,091

(22) Filed: Oct. 27, 2004

(65) Prior Publication Data

US 2006/0148112 A1 Jul. 6, 2006

Related U.S. Application Data

(63) Continuation-in-part of application No. 10/817,701, filed on Apr. 2, 2004.

(51) Int. Cl.
*H01G 9/00* (2006.01)
(52) U.S. Cl. ........................ 361/502; 361/503
(58) Field of Classification Search ................ 361/502, 361/503
See application file for complete search history.

(56) References Cited

U.S. PATENT DOCUMENTS

| | | | |
|---|---|---|---|
| 2,692,210 A | 10/1954 | Burnham | |
| 3,528,955 A | 9/1970 | Lippman et al. | |
| 3,864,124 A | 2/1975 | Breton et al. | |
| 4,129,633 A | 12/1978 | Biddick | |
| 4,153,661 A | 5/1979 | Ree et al. | |
| 4,175,055 A | 11/1979 | Goller et al. | |
| 4,177,159 A | 12/1979 | Singer | |
| 4,194,040 A | 3/1980 | Breton et al. | |
| 4,287,232 A | 9/1981 | Bernstein et al. | |
| 4,313,972 A | 2/1982 | Goller et al. | |
| 4,317,789 A | 3/1982 | Groukt et al. | |
| 4,320,185 A | 3/1982 | Bernstein et al. | |
| 4,336,217 A | 6/1982 | Seuer | |
| 4,354,958 A | 10/1982 | Solomon | |
| 4,383,010 A | 5/1983 | Spaepen | |
| 4,500,647 A | 2/1985 | Solomon et al. | |
| 4,556,618 A | 12/1985 | Shia | |

(Continued)

FOREIGN PATENT DOCUMENTS

EP 0617441 A1 9/1994

(Continued)

*Primary Examiner*—Eric W. Thomas
(74) *Attorney, Agent, or Firm*—Hensley Kim & Edgington, LLC (57) ABSTRACT

Electrodes of a double-layer capacitor are designed so that sub-capacitors formed at each electrode are stressed substantially equally at the rated voltage of the double-layer capacitor. In an exemplary embodiment, each electrode includes a current collector and an active electrode layer, such as a layer of activated carbon. The electrodes are held apart by a porous separator, and the assembly is immersed in an electrolyte. The thicknesses of the active electrode layers differ, resulting in asymmetrical construction of the capacitor. Different thicknesses cause the sub-capacitors to have different capacitances. When voltage is applied to the double-layer capacitor, the voltage is divided unequally between the unequal sub-capacitors. Properly selected thicknesses allow the voltages at the sub-capacitors to stress equally each sub-capacitor. The rated voltage of the double-layer capacitor can then be increased without overstressing the sub-capacitors.

14 Claims, 8 Drawing Sheets

U.S. PATENT DOCUMENTS

| | | | |
|---|---|---|---|
| 4,822,701 A | 4/1989 | Ballard et al. | |
| 4,895,775 A | 1/1990 | Kato et al. | |
| 4,917,309 A | 4/1990 | Zander et al. | |
| 4,992,910 A | 2/1991 | Evans | |
| 5,100,747 A | 3/1992 | Hayashida et al. | |
| 5,150,283 A | 9/1992 | Yoshida et al. | |
| 5,168,019 A | 12/1992 | Sugeno | |
| 5,198,313 A | 3/1993 | Juergens | |
| 5,393,617 A | 2/1995 | Klein | |
| 5,450,279 A | 9/1995 | Yoshida et al. | |
| 5,478,363 A | 12/1995 | Klein | |
| 5,478,668 A | 12/1995 | Gozdz et al. | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,682,288 A | 10/1997 | Wahni | |
| 5,706,165 A | 1/1998 | Saito et al. | |
| 5,707,763 A | 1/1998 | Shimizu et al. | |
| 5,786,555 A | 7/1998 | Saito et al. | |
| 5,786,980 A | 7/1998 | Evans | |
| 5,849,431 A | 12/1998 | Kita et al. | |
| 5,955,215 A | 9/1999 | Kurzweil et al. | |
| 5,973,912 A | 10/1999 | Kibi et al. | |
| 6,022,436 A | 2/2000 | Koslow et al. | |
| 6,031,712 A | 2/2000 | Kurihara et al. | |
| 6,127,474 A | 10/2000 | Andelman | |
| 6,181,545 B1 | 1/2001 | Amatucci et al. | |
| 6,207,251 B1 | 3/2001 | Balsimo et al. | |
| 6,236,560 B1 | 5/2001 | Ikeda et al. | |
| 6,245,464 B1 | 6/2001 | Spillman et al. | |
| 6,301,092 B1 | 10/2001 | Hata et al. | |
| 6,304,426 B1 | 10/2001 | Wei et al. | |
| 6,310,756 B1 | 10/2001 | Miura et al. | |
| 6,349,027 B1 | 2/2002 | Suhara et al. | |
| 6,359,769 B1 | 3/2002 | Mushiake et al. | |
| 6,403,257 B1 | 6/2002 | Christian et al. | |
| 6,447,669 B1 | 9/2002 | Lain | |
| 6,459,564 B1 * | 10/2002 | Watanabe et al. | 361/502 |
| 6,589,299 B2 | 7/2003 | Missling et al. | |
| 6,614,646 B2 | 9/2003 | Bogaki et al. | |
| 6,627,252 B1 | 9/2003 | Nanjundiah et al. | |
| 6,697,249 B2 | 2/2004 | Maletin et al. | |
| 6,795,297 B2 | 9/2004 | Iwaida et al. | |
| 6,831,826 B2 | 12/2004 | Iwaida et al. | |
| 6,841,594 B2 | 1/2005 | Jones et al. | |
| 6,847,517 B2 | 1/2005 | Iwaida et al. | |
| 6,906,911 B2 | 6/2005 | Ikeda et al. | |
| 6,912,116 B2 | 6/2005 | Takahashi et al. | |
| 6,918,991 B2 | 7/2005 | Chickering, III et al. | |
| 2002/0039275 A1 | 4/2002 | Takeuchi et al. | |
| 2002/0096661 A1 | 7/2002 | Shinozaki et al. | |
| 2002/0122985 A1 | 9/2002 | Sato et al. | |
| 2002/0150812 A1 | 10/2002 | Kaz et al. | |
| 2002/0163773 A1 | 11/2002 | Niori et al. | |
| 2002/0167784 A1 | 11/2002 | Takatami et al. | |
| 2003/0030963 A1 | 2/2003 | Tennent et al. | |
| 2003/0113636 A1 | 6/2003 | Sano et al. | |
| 2003/0157314 A1 | 8/2003 | Penneau et al. | |
| 2003/0175494 A1 | 9/2003 | Penneau et al. | |
| 2003/0186110 A1 | 10/2003 | Sloop | |
| 2005/0064289 A1 | 3/2005 | Suzuki et al. | |
| 2005/0266298 A1 | 12/2005 | Mitchell et al. | |
| 2005/0266990 A1 | 12/2005 | Iwasaki et al. | |
| 2006/0035785 A1 | 2/2006 | Tanaka | |

FOREIGN PATENT DOCUMENTS

| | | |
|---|---|---|
| EP | 1009058 A1 | 6/2000 |
| EP | 1126536 A2 * | 8/2001 |
| JP | 01241811 A | 9/1989 |
| JP | 04067610 A | 3/1992 |
| JP | 04088619 | 3/1992 |
| JP | 09183604 A | 7/1997 |

* cited by examiner

ELECTRODE DESIGN

RELATED APPLICATIONS

The present invention is a CIP of copending and commonly assigned U.S. patent application Ser. No. 10/817,701, filed 2 Apr. 2004, from which priority is claimed and which is incorporated herein by reference.

FIELD OF THE INVENTION

The present invention relates generally to fabrication of electrical energy storage devices, and, more specifically, to design of electrodes for electrical energy storage devices, such as double-layer capacitors.

BACKGROUND

Electrical energy storage cells are widely used to provide power to electronic, electrical, electromechanical, electrochemical, and other useful devices. Such cells include primary chemical cells, secondary (rechargeable) cells, fuel cells, and various species of capacitors. Important characteristics of electrical energy storage cells include energy density, power density, charging rate, internal leakage current, equivalent series resistance (ESR), and ability to withstand multiple charge-discharge cycles. For a number of reasons, double-layer capacitors, also known as supercapacitors and ultracapacitors, are gaining prominence among the various electrical energy storage cells. These reasons include availability of double-layer capacitors with high power densities, and energy densities approaching those of conventional rechargeable cells.

Double-layer capacitors use electrodes immersed in an electrolyte (an electrolytic solution) as their energy storage element. Typically, a porous separator soaked in the electrolyte ensures that the electrodes do not come in contact with each other, thus preventing electronic current flow directly between the electrodes. The porous separator allows ionic currents to flow between the electrodes in both directions. As discussed below, double-layers of charges are formed at the interfaces between the solid electrodes and the electrolyte.

When electric potential is applied between a pair of electrodes of a double-layer capacitor, ions that exist within the electrolyte are attracted to the surfaces of the oppositely-charged electrodes, and migrate towards the electrodes. A layer of oppositely-charged ions is thus created and maintained near each electrode surface. The electrical energy is stored in the charge separation layers between these ionic layers and the charge layers of the corresponding electrode surfaces. The charge separation layers behave essentially as electrostatic capacitors. Electrostatic energy can also be stored in the double-layer capacitors through orientation and alignment of molecules of the electrolytic solution under influence of the electric potential.

Although double-layer capacitors may store additional energy through electrochemical processes, such effects are secondary, accounting for less than ten percent of the electrostatically stored energy in a typical double-layer capacitor.

In comparison to conventional capacitors, double-layer capacitors have high capacitance in relation to their volume and weight. There are two main reasons for this volumetric and weight efficiency. First, the charge separation layers are very narrow. Their width are typically on the order of nanometers. Second, the electrodes can be made from a porous material, having very large effective surface area per unit volume. Because capacitance is directly proportional to the electrode area, and inversely proportional to the width of the charge separation layer, the combined effect of the narrow charge separation layer and large effective surface area results in a capacitance that is very high in comparison to that of conventional capacitors. High capacitance of the double-layer capacitors allows the capacitors to receive, store, and release large supplies of electrical energy.

Another important performance characteristic of a capacitor is its internal equivalent series resistance. Frequency response of a capacitor depends on the characteristic time constant of the capacitor, which is essentially a product of the capacitance and the equivalent series resistance, or RC. To put it differently, equivalent series resistance limits both charge and discharge rates of a capacitor, because the resistance limits the current flow into or out of the capacitor. Maximizing the charge and discharge rates is important in many applications, such as automotive applications. Excessive internal resistance also dissipates energy during both charge and discharge cycles, converting the electric energy into heat. This reduces capacitor efficiency, and may affect both durability and reliability. Therefore, equivalent series resistance should be kept reasonably low.

Electrical energy storage capability of a capacitor can be determined using a well known formula, to wit:

$$E = \frac{C * V^2}{2}, \qquad (1)$$

in which E is the stored energy, C is the capacitance, and V is the voltage of the charged capacitor. Thus, the maximum energy ($E_m$) that can be stored in a capacitor is given by the following expression:

$$E_m = \frac{C * V_r^2}{2}, \qquad (2)$$

where $V_r$ stands for the rated voltage of the capacitor. It follows that a capacitor's energy storage capability depends on both (1) its capacitance, and (2) its rated voltage. Increasing these two parameters is therefore important to capacitor performance. Indeed, because energy capacity varies as a second order of the voltage rating, while varying linearly with capacitance, increasing the voltage rating is the more important goal for capacitors in many applications. With increases in voltage rating, it is understood that increases in power density may also be achieved.

Voltage ratings of double-layer capacitors are generally limited by chemical reactions (reduction, oxidation) and breakdown within the electrolytic solutions in the presence of electric field generated between electrodes. Electrolytic solutions currently used in double-layer capacitors are of two kinds. The first kind of electrolytic solutions includes organic solutions, such as propylene carbonate and Acetronitrile.

The second kind of double-layer electrolytic solutions includes aqueous solutions, such as potassium hydroxide and sulfuric acid solutions.

Both reduction and oxidation processes can be identified from what is known to those skilled in the art as a CV curve, which may obtained by cyclically applying a varying voltage to a double-layer capacitor and measuring a resulting capacitance.

Organic electrolyte may typically enable higher operating voltage as compared to aqueous electrolyte, however, because of the conductivity of organic electrolytes, equivalent series resistance may be higher.

Whatever the nature of the specific double-layer capacitors or other energy storage cells of interest, it would be desirable to increase their voltage ratings.

As used later for comparisons, a comparative double-layer capacitor manufactured with active electrode films of similar thickness was tested. In one embodiment, the thickness of the electrode films was about 100 microns. A particular activated carbon used in manufacture of the activated electrode film for use in a double-layer capacitor was a type YP-17 sold by Kuraray Chemical Co., LTD, Shin-hankyu Bldg. 9F Blvd. C-237, 1-12-39 Umeda, Kiata-ku, Osaka 530-8611, Japan. Empirical test data from the comparative double-layer capacitor was obtained, and indicated that performance of the capacitor decreased as the operating voltage of the capacitor was increased above 2.5 volts. For example, the number of times the comparative double-layer capacitor could be charged and discharged was seen to decrease with increased operating voltage.

A need thus exists for double-layer capacitors with enhanced energy storage capabilities. Another need exists for double-layer capacitors with increased voltage ratings. Yet another need exists for methods of designing and manufacturing double-layer capacitors with increased voltage ratings and enhanced energy and power density capabilities.

SUMMARY

The present invention is directed to methods for determining relative sizes of electrodes for energy storage devices, such as double-layer capacitors, that satisfy one or more of these needs. The present invention is also directed to double-layer capacitors manufactured by means of such methods. An exemplary embodiment of the invention herein disclosed is a method of selecting thicknesses of active electrode layers of a double-layer capacitor. In accordance with the method, a positive voltage limit for a first sub-capacitor formed at a positive electrode of the double-layer capacitor and a negative voltage limit for a second sub-capacitor formed at a negative electrode of the double-layer capacitor are determined. A first ratio of the second sub-capacitor to the first sub-capacitor is calculated by dividing the positive voltage limit by the negative voltage limit. The relative thicknesses of active electrode layers at the positive and negative electrodes are set so that capacitance of the second sub-capacitor is substantially equal to a product of the first ratio and the capacitance of the first sub-capacitor.

Setting the relative thicknesses can be accomplished by performing the following procedure. First and second normalized sub-capacitances of the first and second sub-capacitors, respectively, are determined. A specific proportionality constant is calculated by dividing the first volume-normalized sub-capacitance by the second normalized sub-capacitance. The relative thicknesses are chosen so that a ratio of thickness of the active electrode layer at the negative electrode to thickness of the active electrode layer at the positive electrode is substantially equal to a product of (1) the first ratio, and (2) the specific proportionality constant.

Determination of the positive and the negative voltage limits can be carried out using an equidistant selection method, whereby the distances between each of these voltage limits and the nearest voltage corresponding to immediate or substantially immediate failure of a corresponding sub-capacitor are substantially equal. In accordance with one alternative, determination of the positive and the negative voltage limits can be carried out using an equal reliability selection method, whereby continuing or frequent operation at each voltage limit results in a substantially equal probability of failure for each sub-capacitor. The equidistant selection method, equal reliability method, and other methods for determining the positive and the negative voltage limits can be based on data obtained using cyclic voltammetry measurements.

The step of determining the first and second normalized sub-capacitances can be performed by direct measurement. In one alternative embodiment, these variables are determined by applying an analytical capacitance model to physical properties of electrolyte of the double-layer capacitor and of material of the active electrode layers.

In one embodiment, a method of selecting thicknesses of active electrode layers of a double-layer capacitor comprises the steps of: determining a positive voltage limit for a first sub-capacitor formed at a positive electrode of the double-layer capacitor and a negative voltage limit for a second sub-capacitor formed at a negative electrode of the double-layer capacitor; dividing the positive voltage limit by the negative voltage limit to obtain a first ratio of the second sub-capacitor to the first sub-capacitor; setting relative thicknesses of active electrode layer at the positive electrode and active electrode layer at the negative electrode so that capacitance of the second sub-capacitor is substantially equal to a product of the first ratio and the capacitance of the first sub-capacitor. The step of setting relative thicknesses may comprise: determining a first normalized sub-capacitance of the first sub-capacitor; determining a second normalized sub-capacitance of the second sub-capacitor; dividing the first normalized sub-capacitance by the second normalized sub-capacitance to obtain a specific proportionality constant; and choosing the relative thicknesses so that a ratio of thickness of the active electrode layer at the negative electrode to thickness of the active electrode layer at the positive electrode is substantially equal to a product of the first ratio and the specific proportionality constant. The step of determining a positive voltage limit and a negative voltage limit may comprise using an equidistant selection method. The step of determining a positive voltage limit and a negative voltage limit may comprise using an equal reliability selection method. The step of determining a positive voltage limit and a negative voltage limit may comprise using cyclic voltammetry measurements. The step of determining a first normalized sub-capacitance may comprise measuring the first normalized sub-capacitance of the first sub-capacitor, and the step of determining a second normalized sub-capacitance may comprise measuring the second normalized sub-capacitance of the second sub-capacitor. The step of determining a first normalized sub-capacitance may comprise applying an analytical capacitance model to physical properties of electrolyte of the double-layer capacitor and of material of the active electrode layers; and the step of determining a second normalized sub-capacitance may comprise applying the analytical capacitance model to the physical properties of electrolyte of the double-layer capacitor and of material of the active electrode layers. The physical properties used in the analytical model may comprise sizes of cations and anions of the electrolyte. The physical properties used in the analytical model may further comprise sizes of pores of the material of the active electrode layers. The electrolyte may an aqueous electrolytic solution, and the physical properties used in the analytical model comprise sizes of cations and anions of the aqueous electrolytic solution.

In one embodiment, a method of constructing a double-layer capacitor, comprises providing active electrode layers; providing an electrolyte; and immersing the active electrode layers in the electrolyte; wherein the step of providing active electrode layers comprises: determining a positive voltage limit for a first sub-capacitor formed at a positive electrode of the double-layer capacitor and a negative voltage limit for a second sub-capacitor formed at a negative electrode of the double-layer capacitor; dividing the positive voltage limit by the negative voltage limit to obtain a first ratio of the second sub-capacitor to the first sub-capacitor; and setting relative thicknesses of active electrode layer at the positive electrode and active electrode layer at the negative electrode so that capacitance of the second sub-capacitor is substantially equal to a product of the first ratio and the capacitance of the first sub-capacitor. The step of setting relative thicknesses may comprise: determining a first normalized sub-capacitance of the first sub-capacitor; determining a second normalized sub-capacitance of the second sub-capacitor; dividing the first normalized sub-capacitance by the second normalized sub-capacitance to obtain a specific proportionality constant; and choosing the relative thicknesses so that a ratio of thickness of the active electrode layer at the negative electrode to thickness of the active electrode layer at the positive electrode is substantially equal to a product of the first ratio and the specific proportionality constant. The step of determining a positive voltage limit and a negative voltage limit may comprise using an equidistant selection method. The step of determining a positive voltage limit and a negative voltage limit may comprise using an equal reliability selection method. The step of determining a positive voltage limit and a negative voltage limit may comprise using cyclic voltammetry measurements. The step of determining a first normalized sub-capacitance may comprise measuring the first normalized sub-capacitance of the first sub-capacitor, and the step of determining a second normalized sub-capacitance may comprise measuring the second normalized sub-capacitance of the second sub-capacitor. The step of determining a first normalized sub-capacitance may comprise applying an analytical capacitance model to physical properties of electrolyte of the double-layer capacitor and of material of the active electrode layers; and the step of determining a second normalized sub-capacitance may comprise applying the analytical capacitance model to the physical properties of electrolyte of the double-layer capacitor and of material of the active electrode layers. The physical properties used in the analytical model may comprise sizes of cations and anions of the electrolyte. The physical properties used in the analytical model may further comprise sizes of pores of the material of the active electrode layers. The electrolyte may comprise an aqueous electrolytic solution, and the physical properties used in the analytical model comprise sizes of cations and anions of the aqueous electrolytic solution.

In one embodiment, a double-layer capacitor may comprise an electrolyte; a positive electrode layer of a first thickness, the positive electrode layer being immersed in the electrolyte; and a negative electrode layer of a second thickness, the negative electrode layer being immersed in the electrolyte; wherein: a first sub-capacitor is formed at an interface between the positive electrode layer and the electrolyte; a second sub-capacitor is formed at an interface between the negative electrode layer and the electrolyte; and the first and second thicknesses are selected by: determining a positive voltage limit for the first sub-capacitor and a negative voltage limit for the second sub-capacitor; dividing the positive voltage limit by the negative voltage limit to obtain a first ratio of the second sub-capacitor to the first sub-capacitor; and setting relative thicknesses of the positive electrode layer and the negative electrode layer so that capacitance of the second sub-capacitor is substantially equal to a product of the first ratio and the capacitance of the first sub-capacitor.

In one embodiment, the relative thicknesses may be set by: determining a first normalized sub-capacitance of the first sub-capacitor; determining a second normalized sub-capacitance of the second sub-capacitor; dividing the first normalized sub-capacitance by the second normalized sub-capacitance to obtain a specific proportionality constant; and choosing the relative thicknesses so that a ratio of thickness of the negative electrode layer to thickness of the positive electrode layer is substantially equal to a product of the first ratio and the specific proportionality constant. The positive voltage limit and the negative voltage limit may be determined by using an equidistant selection method. The positive voltage limit and the negative voltage limit may be determined by using an equal reliability selection method. The positive voltage limit and the negative voltage limit may be determined by using cyclic voltammetry measurements. The first and second normalized sub-capacitances may be determined by measuring. The first and second normalized sub-capacitances may be determined by applying an analytical capacitance model to physical properties of the electrolyte and of material of the positive and negative electrode layers. The physical properties used in the analytical model may comprise sizes of cations and anions of the electrolyte. The physical properties used in the analytical model may further comprise sizes of pores of the material of the positive and negative electrode layers. The electrolyte may comprise an aqueous electrolytic solution, and the physical properties used in the analytical model may comprise sizes of cations and anions of the aqueous electrolytic solution. In one embodiment, a double-layer capacitor may further comprise a positive current collector attached to the positive electrode layer, a negative current collector attached to the negative electrode layer, and a porous separator interposed between the positive electrode layer and the negative electrode layer to prevent direct electronic current flow between the positive electrode layer and the negative electrode layer, and to allow ionic current flow between the positive electrode layer and the negative electrode layer. The first ratio may be less than or equal to about 0.47. The first ratio may be less than or equal to about 0.47 and more than or equal to about 0.35. The electrode layers may comprise dry fibrillized particles. The sum of the absolute values of the positive and the negative voltage limits may be equal to or greater than about 2.5 volts.

In one embodiment, a double layer capacitor product comprises a positive electrode film of a first thickness; and a negative electrode film of a second thickness; wherein the first thickness is greater than the second thickness. In one embodiment, after 40,000 charge discharge cycles a degradation in capacitance of the product is less than 30 percent. The first electrode layer and the second electrode layer may comprise dry fibrillized particles.

In one embodiment, an energy storage product comprises a positive electrode film of a first thickness; and a negative electrode film of a second thickness; wherein the first thickness is different than the second thickness and wherein the positive electrode film and the negative electrode film comprise dry fibrillized particles.

These and other benefits, advantages, features, and aspects of the present invention will be better understood with reference to the following description, drawings, and appended claims.

DETAILED DESCRIPTION

Reference will now be made in detail to one or more embodiments of the invention that are illustrated in the accompanying drawings. Same or similar reference numerals may be used in the drawings and the description to refer to the same or like parts. The drawings are in a simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner. In addition, the words couple, attach, connect, and similar expressions may be used interchangeably, unless the difference is noted or made otherwise clear from the context.

Figure 1:
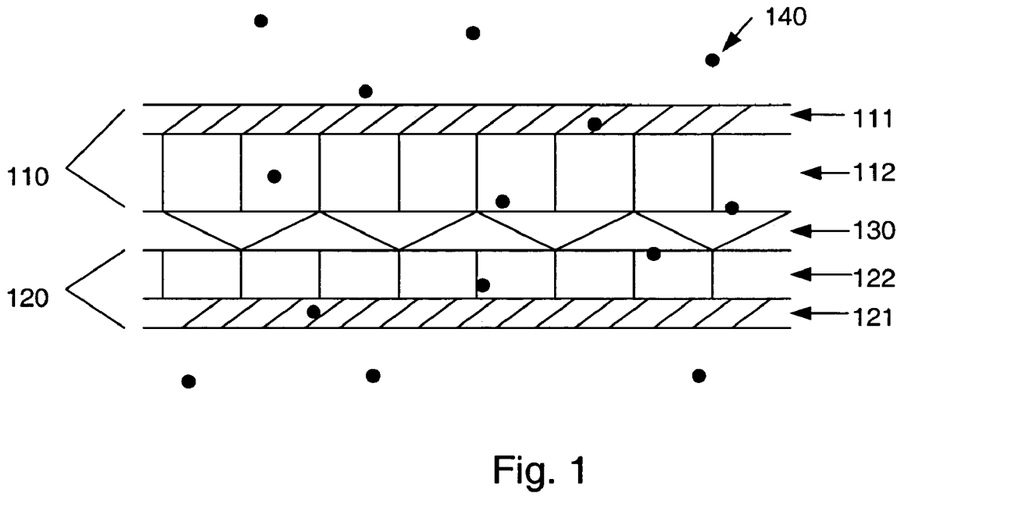
FIG. 1 is a high-level cross-sectional view of a double-layer capacitor, in accordance with an embodiment of the present invention.

Referring more particularly to the drawings, FIG. 1 is a simplified view of a cross-section of a portion of a double-layer capacitor 100 in accordance with the present invention. The double-layer capacitor 100 includes a positive electrode (anode) 110 and a negative electrode (cathode) 120 kept apart by a porous separator 130. The positive electrode 110 includes a current collector 111 and an active electrode layer 112. Similarly, the negative electrode 120 includes a current collector 121 and an active electrode layer 122. The porous separator 130 and both electrodes 110 and 120 are immersed in an electrolytic solution 140, shown in FIG. 1 as a plurality of dots. The electrolytic solution 140 permeates and impregnates the porous separator 130 and the active electrode layers 112 and 122 of the electrodes 110 and 120.

In representative variants of the illustrated embodiment, the active electrode layers 112 and 122 can be made from activated carbon, conductive carbon, and binder particles. In one embodiment the active electrode layers are manufactured without the use of solvents or additives. In one embodiment, the active electrode layers are manufactured by a process that includes a dry fibrillization step, wherein dry binder particles, for example PTFE, are dry fibrillized in a jet mill in a manner that enmeshes and entraps dry activated carbon and dry conductive carbon particles in a porous matrix comprised of the three types of dry particles. The resulting dry process based product may subsequently be calendared one or more times to form a self-supporting active electrode film that may be used in the manufacture a double-layer capacitor product. As disclosed in further detail in copending and commonly assigned U.S. patent application Ser. No. 10/817,701, filed 2 Apr. 2004, from which priority is claimed and, which is incorporated herein in its entirety, active electrode layers 112 and 122 made of dry particles and by a dry process enables that one or more of the properties of the electrode layers can be substantially improved over that of prior art solvent and additive based processes. Because solvents, processing aids, and/or impurities need not necessarily be added during manufacture of the active electrode layers 112 and 122, resulting interactions between an impregnating electrolyte and the solvents, processing aids, and/or impurities may be reduced. In one embodiment, the current collectors 111 and 121 may be made from aluminum foil, the porous separator 130 may be made from paper, and the electrolytic solution 140 may include 1.5 M tetrametylammonium or tetrafluroborate in Acetronitrile electrolyte. Although a dry processes are discussed as being within the scope of the present invention, it is understood that the principles described herein may also be applied to active electrode layers 112 and 122 made by other known processes and other known compositions, for example, solvent based electrode extrusion and electrode coating processes, as are known to those skilled in the art, and for this reason, the invention and embodiments described herein should be limited by nothing other than the appended claims.

When a voltage source is applied between the current collectors 111 and 121, an electric field is created such that it spans the two layers. Note that the porous separator 130 prevents electronic current flow between the electrodes 110 and 120. At the same time, the porous separator 130 allows ionic current flow between these two electrodes. The electric field thus drives the ions of the electrolytic solution 140 towards the electrodes 110 and 120. Cations (positively charged ions) are driven to the negative electrode 120, while anions (negatively charged ions) are driven to the positive electrode 110. As has already been discussed above, double-layers of charges are formed at the interfaces between the electrodes 110 and 120 and the electrolytic solution 140, with layers of oppositely-charged ions being created and maintained near the surface of each of these electrodes. Each set of the double-layer charges is in effect a capacitor.

Figure 3:
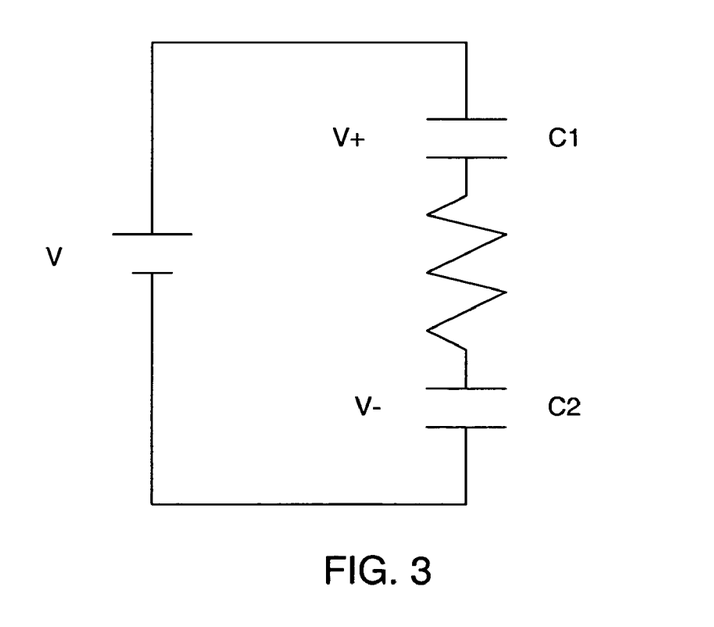
FIG. 3 illustrates a simplified electrical model of a double-layer capacitor of FIG. 1.

Thus, a single double-layer capacitor cell may be considered to comprise two separate double-layer sub-capacitors connected by ionic flow through the porous separator 130. This model is illustrated in FIG. 3. Let us designate capacitance associated with the double-layers formed next to the positive electrode 110 as $C_1$, and capacitance associated with the double-layers formed next to the negative electrode 120 as $C_2$. The combined (total) capacitance $C_T$ of the double-layer capacitor cell 100 is then determined from the following relationship of $C_T$ and the sub-capacitor capacitances $C_1$ and $C_2$:

$$C_T = \frac{C_1 * C_2}{(C_1 + C_2)}. \tag{3}$$

Each of the capacitances $C_1$ and $C_2$ is a function of the volume of its respective active electrode layer 111 or 112, as the case may be, because the surface area exposed to the electrolytic solution 140 depends on these volumes. The capacitances $C_1$ and $C_2$ also depend on a number of other parameters. Some of the important parameters include porosity of the respective active electrode layers 112 and 122, average pore size, pore size distributions, pore shapes, sizes of the positive and negative ions of the electrolyte, and other factors affecting interaction of the electrodes 110 and 120 with the electrolyte 140 and formation of the double-layers of charges.

Because some of these parameters have disparate effects on $C_1$ and $C_2$, it is reasonable to expect that $C_1$ may differ from $C_2$ even when the volumes (thicknesses) and materials of the active electrode layers 112 and 122 are the same. For example, the sizes of the positive and negative ions may differ in a typical electrolytic solution 140. When the pores of the layers 112 and 122 include some that are smaller than the larger of these ions, the effective surface areas of the active electrode layers 112 and 122 may and often do differ. Capacitances per unit volume will then also differ. Thus, in general $C_1 \neq C_2$ for identically sized active electrode layers 112 and 122.

Figure 2:
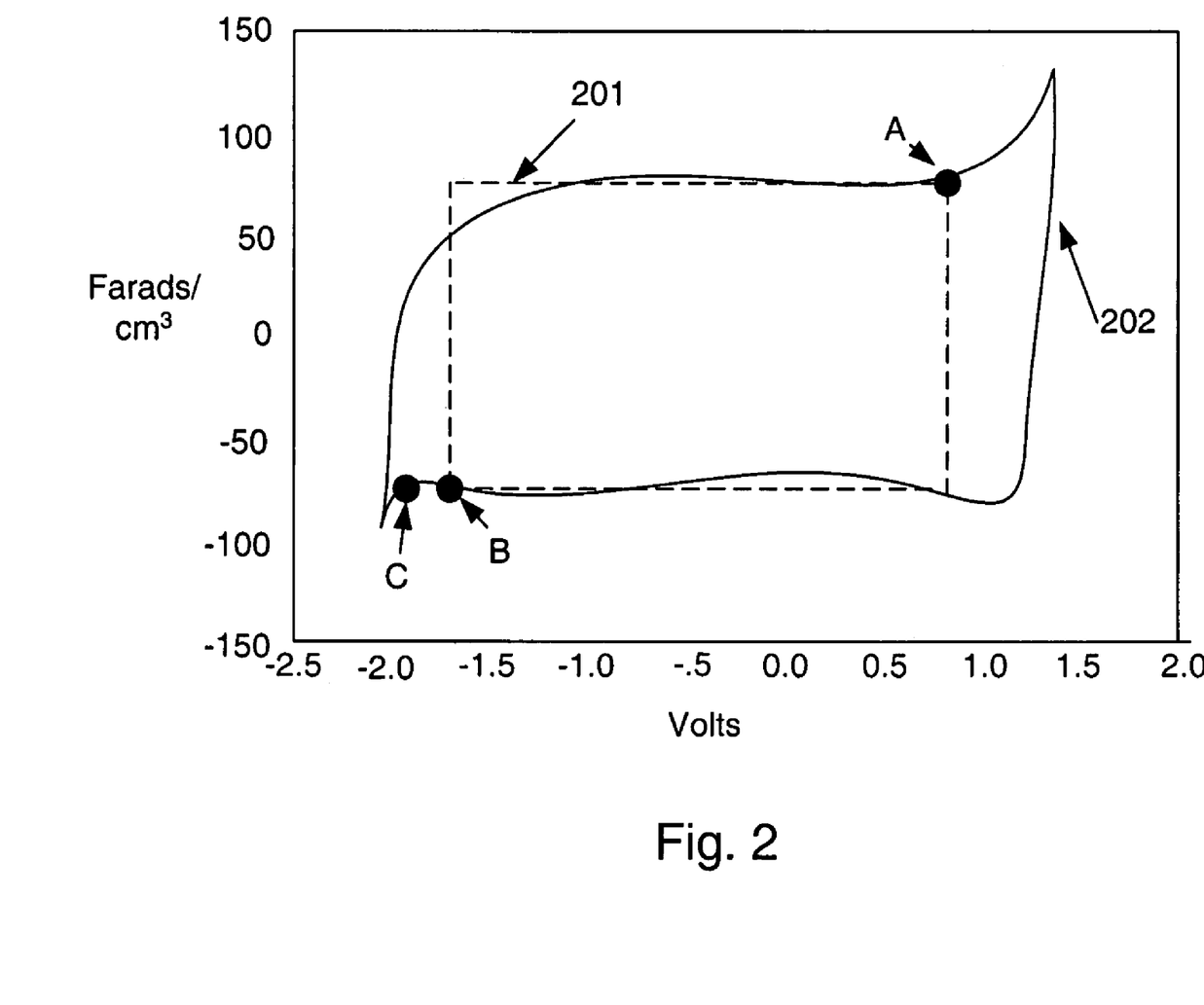
FIG. 2 illustrates a cyclic voltammetry curve for an idealized capacitor electrode, and for an electrode of a double-layer capacitor.

Moreover, at each electrode-electrolyte interface, the breakdown voltages and cyclic voltammetry graphs also differ. FIG. 2 illustrates this phenomenon for one electrode. In FIG. 2, the rectangle 201 represents the cyclic voltammetry relationship of an idealized capacitor. As would be expected, the rectangle 201 is a good approximation of the real-world performance of a conventional electrostatic capacitor, for example, of a ceramic dielectric capacitor. This is so at least where the voltages applied to the capacitor are below the breakdown voltage of the capacitor. Curve 202 in FIG. 2 represents cyclic voltammetry data for active electrode material made with YP-17 activated carbon.

When the voltage applied on the positive part of the cycle is increased, the slope of the curve 202 begins to increase more rapidly (top-right portion of curve 202). Similarly, the slope of the curve 202 increases as an applied negative voltage is increased (bottom left portion of curve 202). Those skilled in the art will identify that both extremes on the graph, as well as non-flat portions of the graph may indicate redox (reduction/oxidation) chemical reactions that can occur, which may at above certain voltages cause potentially irreversible changes. It should also be understood that frequent operation near these limits would likely affect durability and reliability of an electrode and a double-layer capacitor that includes the electrode. Empirical observations have shown that prior art comparative double-layer capacitors constructed with active electrode films, which are typically of similar thickness, exhibit cyclic voltammetry data similar to that presented by FIG. 2, and the rated voltage of such prior art double-layer capacitors should typically not exceed about 2.7 volts. For high charge-discharge, duty and/or current applications, to ensure reliable operation, the empirical determination of the prior art double-layer capacitor nominal operating voltage, in fact, indicates that derating is required to an operating voltage less than 2.7 volts, typically to on the order of about 2.5 volts. It is identified that the nominal operating voltage range for the comparative double-layer capacitor can be correlated to points along a CV curve obtained for the capacitor, for example, by finding a rightmost point along an upper right portion that is along relatively flat portion of the curve and, as well, by subtraction of the empirically determined nominal operating voltage to determine a point along the left lower portion of the curve.

Thus, it is identified that the voltage rating $V_r$ of a double-layer capacitor 100 should be set so that the maximum voltage on the sub-capacitor $C_1$ of the positive electrode 110 does not exceed a positive voltage limit, $V_m^+$, and the voltage on the sub-capacitor $C_2$ of the negative electrode 120 does not exceed a negative voltage limit, $v_m^-$. In this context, both $V_m^+$ and $V_m^-$ are absolute values, i.e., positive quantities.

In one embodiment, the absolute values $V_m^+$ and $v_m^-$ may be selected so that the distances between each of these voltages and the nearest voltage corresponding to immediate or substantially immediate failure of a corresponding sub-capacitor are substantially equal, i.e., equal within reasonable engineering and manufacturing precision. For example, if it is assumed that failure occurs at about 1.5 volts on the positive side and at about 2.0 volts on the negative side (as it appears from FIG. 2), we could set $V_m^+$ and $V_m^-$ at about 0.7 volts and 1.8 volts, respectively. We will refer to this method of selecting $V_m^+$ and $V_m^-$ as the "equidistant" selection method. Alternatively, $V_m^+$ and $V_m^-$ may be selected so that continuing or frequent operation at each extreme results in a substantially equal and small probability of failure for each sub-capacitor. For example, $V_m^+$ and $V_m^-$ can be set so that mean time between failures (MTBF) at rated voltage and highest rated temperature is equal to about one million hours for each sub-capacitor. We will refer to this method of setting $V_m^+$ and $V_m^-$ as the "equal reliability" selection method. Indeed, $V_m^+$ and $V_m^-$ values set in accordance with either of these approaches may be quite close. Other methods of selecting $V_m^+$ and $V_m^-$ may also be used.

Intuition suggests that $$V_m^- > V_m^+ \tag{4}$$

for an electrode having the cyclic voltammetry curve 202 illustrated in FIG. 2. This is because the electrode can be driven to a much higher voltage on the negative side than on the positive side before the onset of the chemical reactions. Moreover, the slope of the curve 202 as the voltage approaches the positive (right) side is much higher than the slope as the voltage approaches the negative (left) side. Empirical results bear out the $V_m^- > V_m^+$ relationship.

Let us now determine voltages $V^+$ and $V^-$ that result across the sub-capacitors $C_1$ and $C_2$ associated with the positive and negative electrodes 110 and 120, respectively, when a voltage $V_{imp}$ is impressed across the capacitor 100. Recall that the equivalent circuit of the capacitor 100 can be approximated by the capacitances $C_1$ and $C_2$ connected in series. Because the combined voltage across the two sub-capacitors is divided in inverse proportion to the capacitances, $$V^+ = \frac{C_2 * V_{imp}}{(C_1 + C_2)}, \text{ and} \tag{5}$$

$$V^- = \frac{C_1 * V_{imp}}{(C_1 + C_2)}. \tag{6}$$

To build a double-layer capacitor in accordance with an embodiment of the present invention, we set relative sub-capacitances $C_1$ and $C_2$ (which are generally proportional to the thicknesses of their corresponding active electrode layers 112 and 122) so that the following relationship holds for properly selected $V_m^+$ and $V_m^-$ when the impressed voltage is equal to the rated voltage ($V_{imp} \approx V_r$):

$$V^+ \approx V_m^+, \tag{7}$$

$$V^- \approx V_m^-, \tag{8}$$

and $$V_r = V_m^+ + V_m^-. \tag{9}$$

In this way, the rated voltage $V_r$ can be maximized.

The discussion below illustrates how the relative capacitances $C_1$ and $C_2$, and the thicknesses of the active electrode layers 112 and 122 can be calculated.

Initially, we define the sub-capacitance proportionality constant, K, by setting $C_2=K*C_1$, to simplify the algebra of the derivations. Combining this definition with equations (5), (7), and (9), we obtain the following relationship:

$$V_m^+ = \frac{K*C_1*(V_m^+ + V_m^-)}{C_1*(1+K)} \equiv \frac{K*(V_m^+ + V_m^-)}{(1+K)}. \tag{10}$$

Rearranging the last equation, we can express K in terms of $V_m^+$ and $V_m^-$:

$$K = \frac{V_m^+}{V_m^-}. \tag{11}$$

The calculated sub-capacitances proportionality constant is thus simply the ratio of the voltage limits $V_m^+$ and $V_m^-$.

As has already been mentioned, a variety of parameters affect specific capacitances that can be obtained at the positive and negative electrodes 110 and 120. We lump their combined effects into a specific capacitance proportionality constant, S, which is defined as the ratio of normalized sub-capacitance at the positive electrode to the normalized sub-capacitance at the negative electrode, where the normalization is carried out over the volumes of the respective active electrode layers. In other words, $$S = \frac{C_1/Volume_1}{C_2/Volume_2} \equiv \frac{C_1*Volume_2}{C_2*Volume_1}, \tag{12}$$

where $Volume_1$ and $Volume_2$ designate the respective volumes of the active electrode layers at the positive and negative electrodes. The constant S can be estimated by plugging the various physical properties of the electrolyte and the electrode materials into an appropriate analytical model. Alternatively, the constant S can be measured for samples of different electrolytes and different active electrode layer materials.

Using the calculated value of K and the estimated or measured value of S, we can now proceed to obtain a relationship expressing the relative thicknesses $T_1$ and $T_2$ of the active electrode layers 112 and 122, respectively. Assuming that the areas of the electrodes are substantially the same, equation (12) becomes:

$$S = \frac{C_1*Volume_2}{C_2*Volume_1} \equiv \frac{C_1*T_2}{C_2*T_1}. \tag{13}$$

(If areas of the active electrode layers do differ, the difference in practice is likely to be relatively small, as in the case where the porous separator is sandwiched between the positive and negative electrodes, and the composite structure is formed into a jellyroll. In any event, we can lump the difference between the areas of the active electrode layers 112 and 122 into the constant S.)

Rearranging the terms of the equation (13) and substituting $(K*C_1)$ for $C_2$, we obtain:

$$\frac{T_2}{T_1} = S * \frac{C_2}{C_1} \equiv S * K. \tag{14}$$

Referring again to FIG. 1, the relative thicknesses $T_1$ and $T_2$ of the active electrode layers 112 and 122 have been set using equation (14). Because equation (14) dictated that $T_1$ be greater than $T_2$ in this particular example, the resulting double-layer capacitor 100 is asymmetrical such that the positive electrode 110 is thicker than the negative electrode 120. This structure allows the rated voltage to be raised, while stressing both sub-capacitors of the capacitor 100 in substantially equal degrees. Note that the relationship between $T_1$ and $T_2$ can be reversed in some embodiments, depending on the specific physical characteristics of the materials used.

Electrodes fabricated in accordance with the present invention can be used in many different applications, including double-layer capacitors.

Figure 4A:
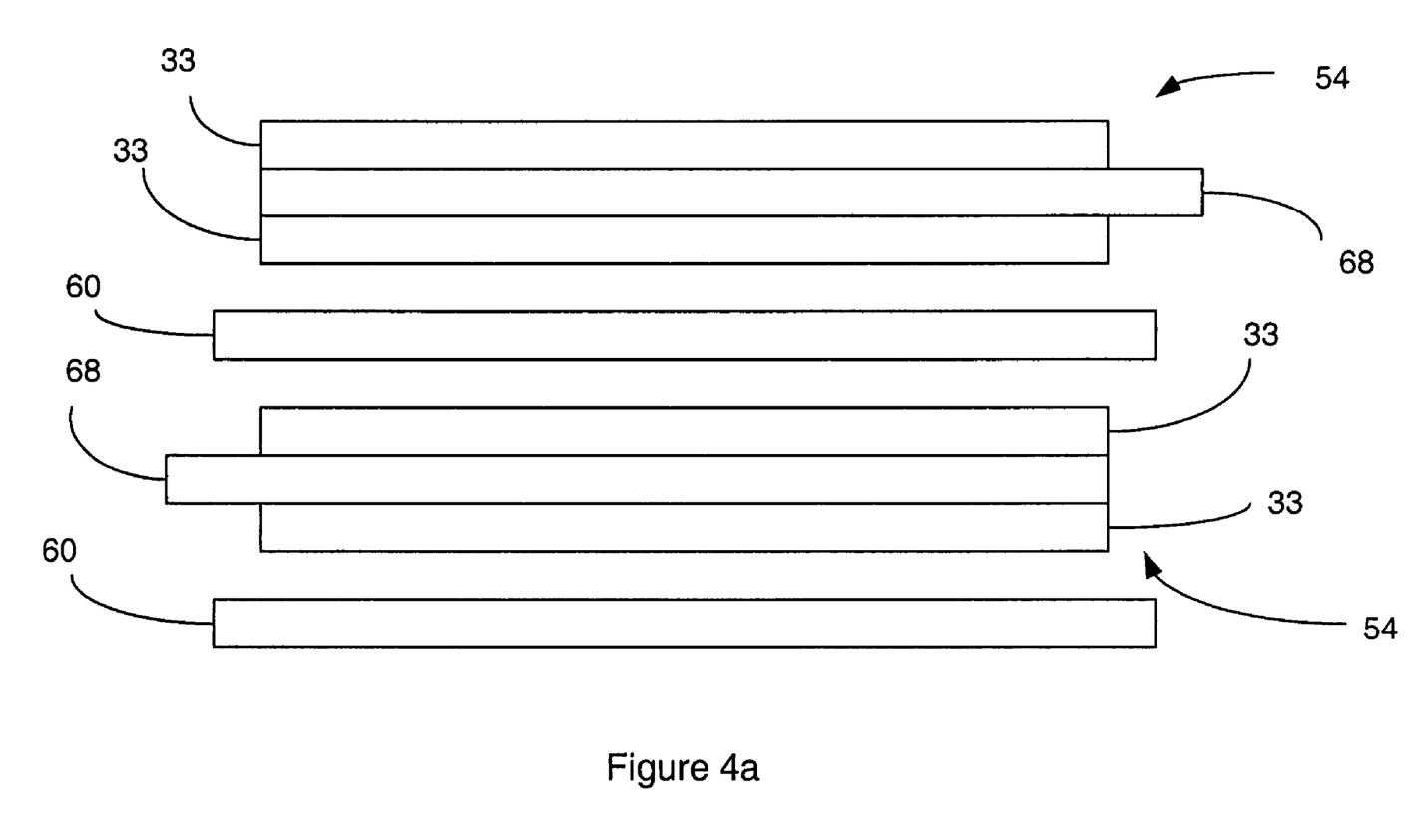
FIG. 4a–4b illustrate electrodes and a jellyroll made therefrom.
Figure 4B:
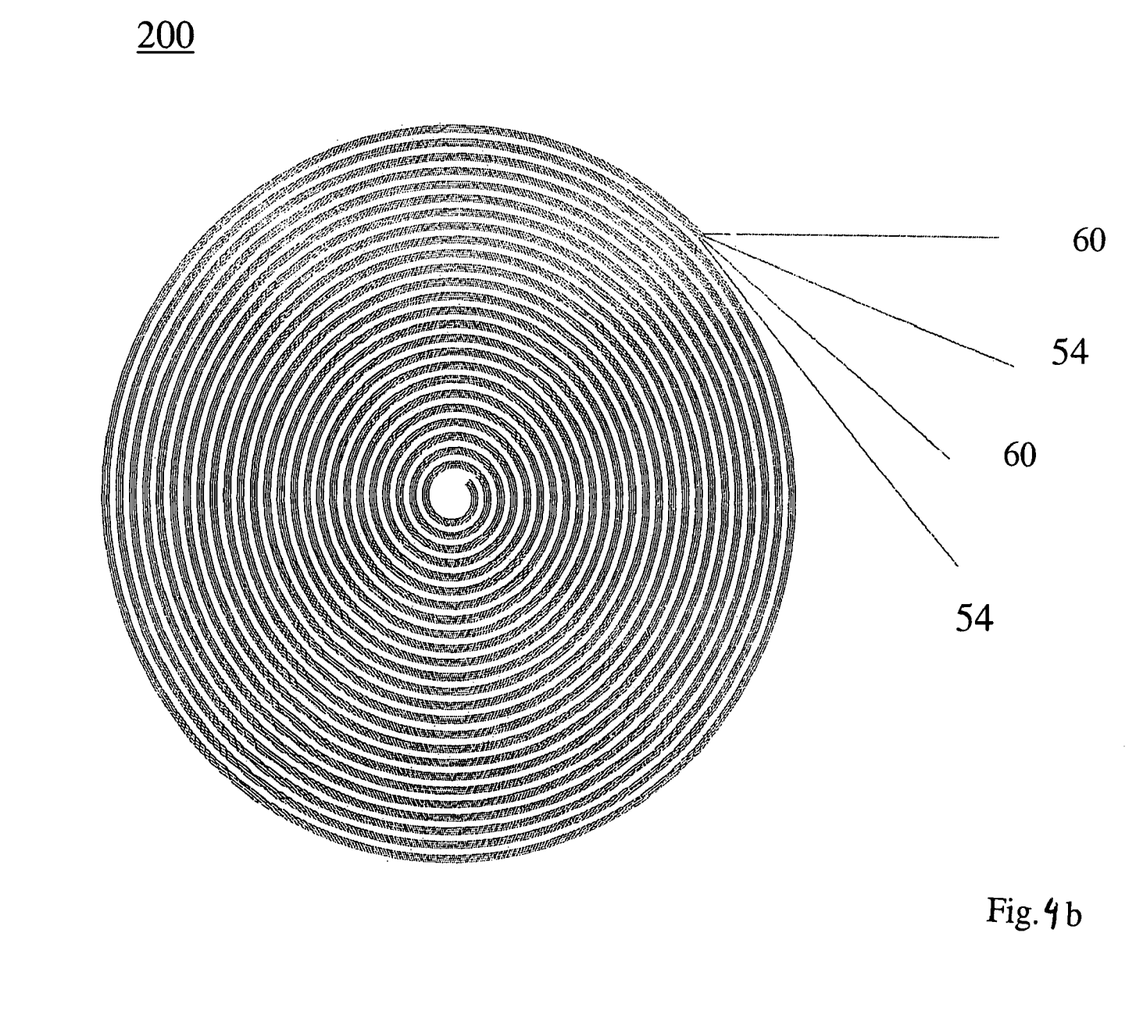

Referring now to FIGS. 4*a* and 4*b*, and preceding Figures as needed, there are seen not to scale views of active electrode layers of a double-layer capacitor. In FIG. 4*a*, there are shown cross-sections of four active electrode films 33 bonded to a respective current collectors 68 to form top and bottom electrodes 54. In one embodiment, top and bottom electrodes 54 are separated by a separator 60. In one embodiment, separator 60 comprises a porous paper sheet of about 30 microns in thickness. In one embodiment, extending ends of respective current collectors 68 are used to provide a point at which electrical contact may be effectuated. In one embodiment, the electrodes 54 and separators 70 are subsequently rolled together in an offset manner that allows an exposed end of a respective collector 68 of the top electrode 54 to extend in one direction and an exposed end of a collector 50 of the bottom electrode 54 to extend in a second direction. The resulting geometry is known to those skilled in the art as a "jellyroll" and is illustrated in a top view by FIG. 4*b*.

Referring now to FIG. 4*b*, and preceding Figures as needed, first and second electrodes 54, and separators 60, are rolled about a central axis to form a jellroll. In one embodiment, active electrode films 33 comprise a thickness, a width, and a length. In one embodiment, a width of the active electrode films 33 comprises between about 10 to 300 mm. In one embodiment, a length is about 0.1 to 5000 meters. In other embodiments, particular dimensions may be may be determined by particular requirements. In one embodiment, wherein the electrodes are utilized in a double-layer capacitor product, the storage capacitance may be between 1 and 5000 Farads. With appropriate changes and adjustments, other electrode film 33 dimensions and other capacitance are within the scope of the invention. Those skilled in the art will understand that offset exposed current collectors 68 extend from the jellroll, such that one collector extends from one end of the roll in one direction and another collector extends from an end of the roll in another direction. In one embodiment, the collectors 68 may be used to make electric contact with internal opposing ends of a sealed housing, which can include corresponding external terminals at each opposing end for completing an electrical contact.

Figure 5:
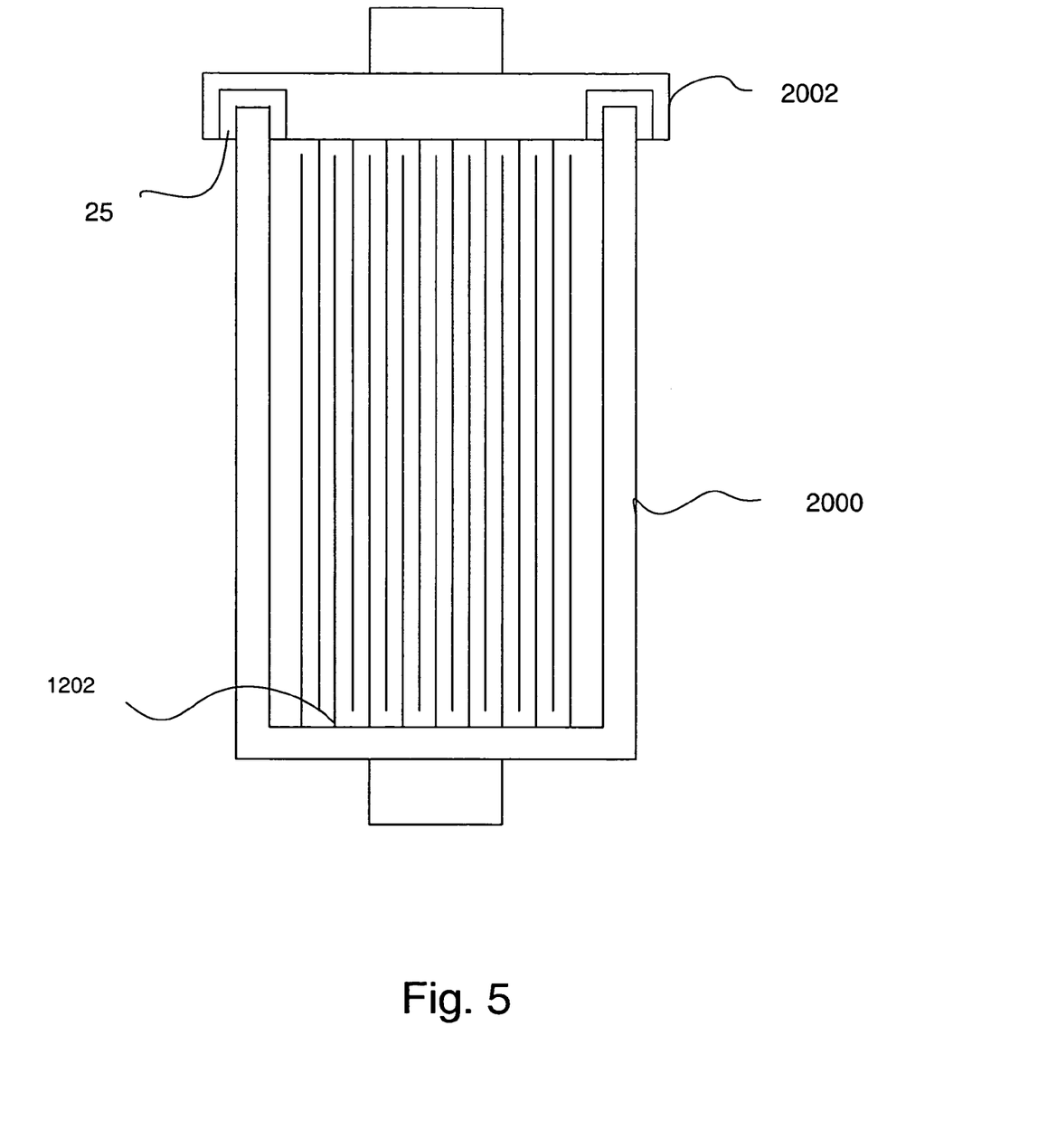
FIG. 5 illustrates a housing and jellyroll disposed therein.

Referring now to FIG. 5, and preceding Figures as needed, there is illustrated a jellyroll inserted into an open end of a housing. In one embodiment, an insulator/seal 25 is placed along a top periphery of a housing 2000 at an open end, and a cover 2002 is placed on the insulator. During manufacture, the housing 2000, insulator, and cover 2002 may be mechanically curled together to form a tight fit around the periphery of the now sealed end of the housing, which after the curling process is electrically insulated from the cover by the insulator. When disposed in the housing 2000, respective exposed collector extensions 1202 of a jellyroll 1200 make internal contact with the bottom end of the housing 2000 and the cover 2002. In one embodiment, external surfaces of the housing 2000 or cover 2002 may include or be coupled to standardized connections/connectors/terminals to facilitate electrical connection to the collectors of the jellyroll 1200 within the housing 2000. Contact between respective collector extensions 1202 and the internal surfaces of the housing 2000 and the cover 2002 may be enhanced by welding, soldering, brazing, conductive adhesive, or the like. In one embodiment, a welding process may be applied to the housing and cover by an externally applied laser welding process. In one embodiment, the housing 2000, cover 2002, and collector extensions 1202 comprise substantially the same metal, for example, aluminum. An electrolyte can be added through a filling/sealing port (not shown) to the sealed housing 2000. In one embodiment, the electrolyte is 1.5 M tetrametylammonium or tetrafluroborate in acetonitrile solvent. After impregnation and sealing, a finished energy storage product is thus made ready for commercial sale and/or subsequent use.

Figure 6A:
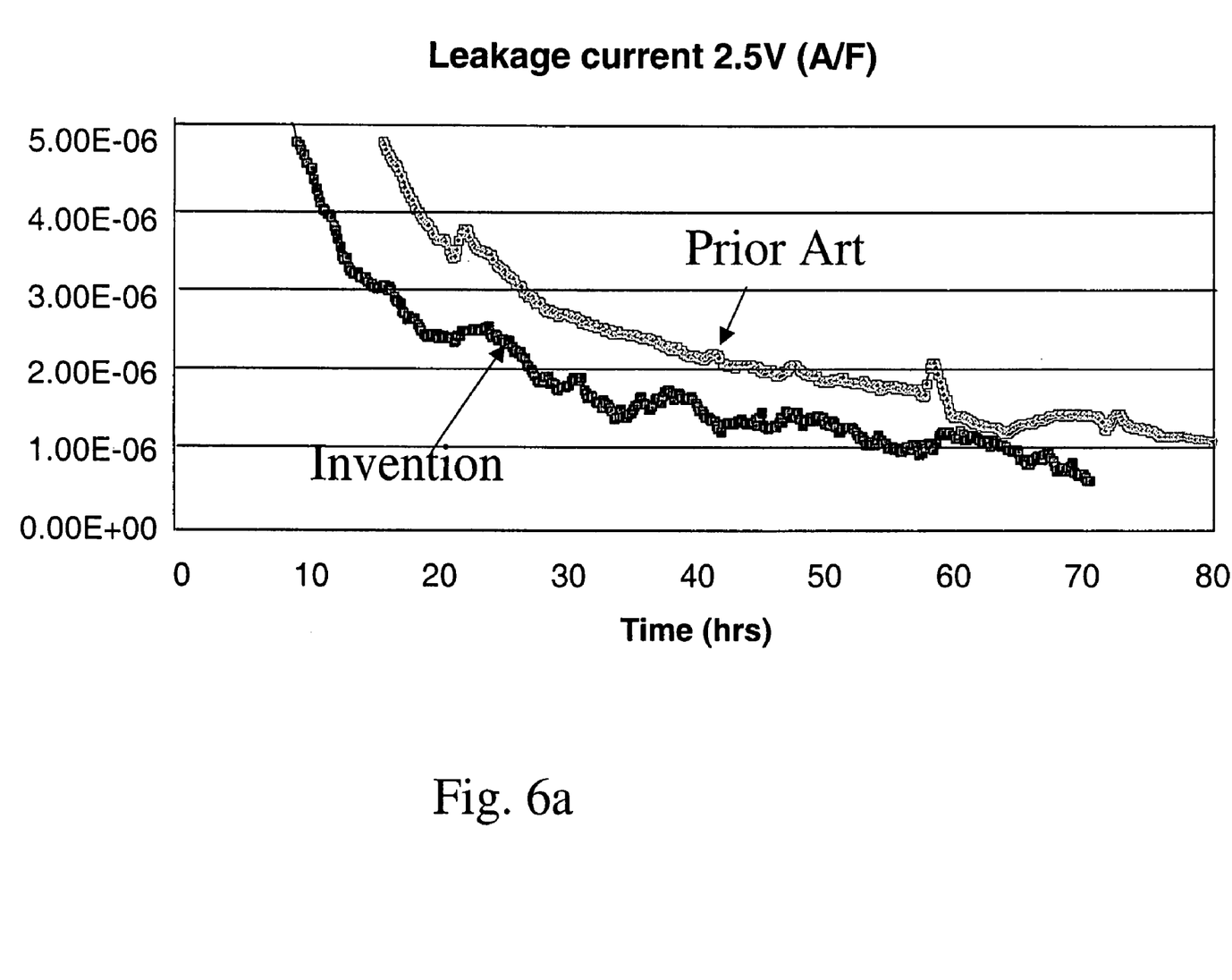
FIGS. 6a–c illustrate performance characteristics and comparisons.
Figure 6B:
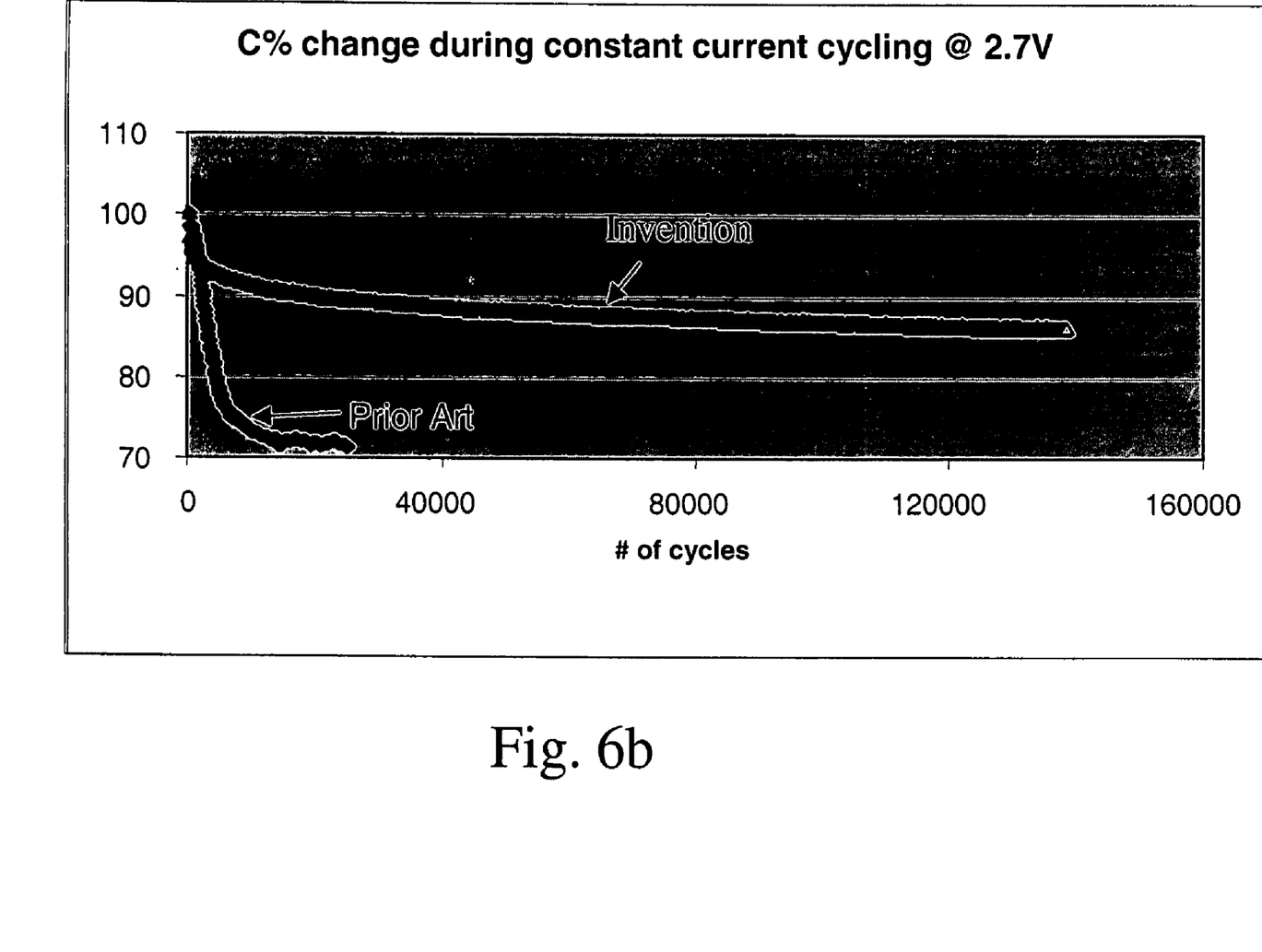
Figure 6C:
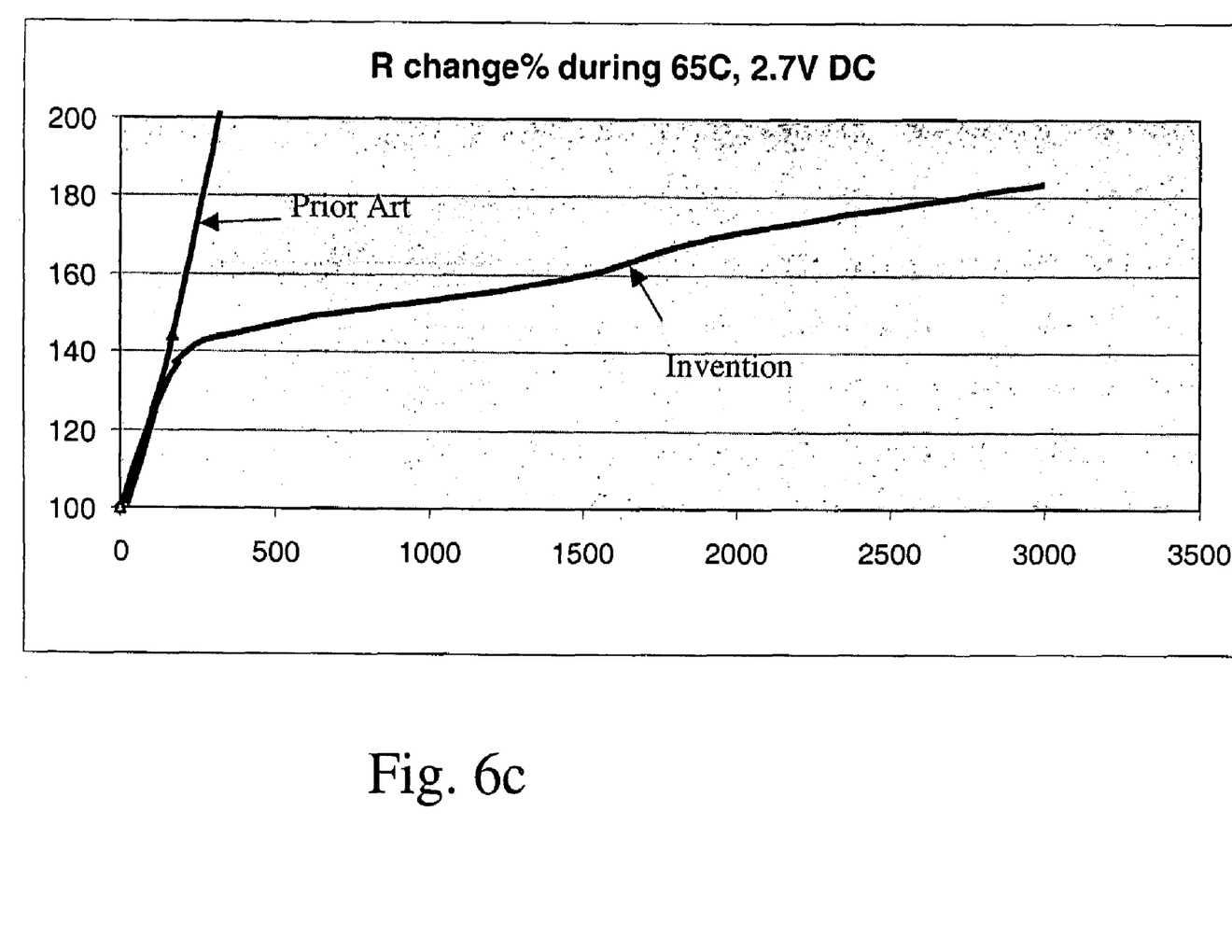

Referring now to FIGS. 6a–c, and other Figures as needed, there are seen representative performance characteristics of double-layer capacitors manufactured in accordance with principles identified and used by the present invention. Those skilled in the art will identify that points along curve 202 (FIG. 2) between points B and C are indicative of relatively low reduction processes (i.e. as indicated by the relative flatness of curve 202 between these points). In accordance with inventive principles previously discussed, operation along curve 202 between points B and C can be effectuated and a double-capacitor can be manufactured to operate reliably and predictably at voltages as high as about 2.7 volts (i.e. absolute value of about 0.8 volts at point A+−1.9 volts at point C). Such 2.7 operation can be achieved without derating as is done with prior art capacitors. Furthermore, with derating, an operating voltage can be achieved that is higher than 2.7 volts. Reduction and oxidation processes that could occur in the prior art remain reduced because operation of the double-layer capacitor can remain constrained to occur at voltages that correspond to operation along relatively flat portions of a curve 202, as can be obtained from the capacitor. Thus, when operated at the same or similar voltages as the prior art, for example between about 2.5 and about 2.7 volts, improved performance characteristics can be achieved over that of the prior art.

In one embodiment, a positive voltage limit for a first sub-capacitor formed at a positive electrode of a double-layer capacitor is selected using values corresponding to a point A, which can be determined by analysis of an empirically obtained curve 202 for evidence of a first sign of appreciable oxidation processes, and a negative voltage limit of a second sub-capacitor formed at a negative electrode of the double-layer capacitor is selected to correspond to point C. In one embodiment, the negative voltage limit is selected to occur at a negative value that is more negative than a point B and along a relatively flat portion of curve 202 (i.e. between points B and C). In one embodiment, the positive voltage limit is divided by the negative voltage limit to obtain a first ratio of the second sub-capacitor to the first sub-capacitor. In one embodiment, the relative thicknesses of the active electrode layers at the positive electrode and active electrode layer at the negative electrode is set so that capacitance of the second sub-capacitor is substantially equal to a product of the first ratio and the capacitance of the first sub-capacitor.

In one embodiment, a first ratio of the second sub-capacitor to the first sub-capacitor was calculated using curve 202 with 0.8 (point A) divided by about 1.9 (point C), or equivalently about 0.42. In this particular embodiment, a thickness of the active electrode layer at a positive electrode was calculated to be 115 microns and a thickness of the active electrode layer at a negative electrode was calculated to be 100 microns. For comparison, using points A and B, the first ratio of the second sub-capacitor to the first sub-capacitor was calculated as about 0.8 divided by about 1.7, or equivalently about 0.47. Empirical observations and measurements were made with a double-layer capacitor comprised of 115 micron and 100 micron active positive and negative electrode layers and are illustrated by FIGS. 6a–c.

Referring to FIG. 6a, and other Figures as needed, there is illustrated that a capacitor comprising YP-17 activated carbon particles made in accordance with principles disclosed by the present invention may at a 2.5 volt operating voltage exhibit lower leakage current than that of a comparative prior art capacitor comprising YP-17 based electrode films of similar thickness (for example, positive and negative electrode films of 100 micron thickness). In FIG. 6b there is illustrated that that capacitance and operating lifetime of a double-layer capacitor made in accordance with principles described herein may at an operating voltage of about 2.7 volts be substantially improved over that of the comparative prior art double-layer capacitor, for example, the number of charge-discharge cycles is increased. In one embodiment of the present invention, after 40,000 charge-discharge cycles, a double layer capacitor experiences a degradation in capacitance that is less than 30 percent of its initial value. As well, in FIG. 2c it is illustrated that an increase in resistance of a double-layer capacitor made over according to the present invention may, over a certain number of charge-discharge cycles and at an operating voltage of about 2.7 volts, be substantially reduced over that of the comparative prior art double-layer capacitor.

Although the particular systems and methods shown and described herein in detail are fully capable of attaining the above described object of this invention, it is understood that the description and drawings presented herein represent some, but not all, embodiments of the invention and are therefore representative of the subject matter which is broadly contemplated by the present invention. For example, although double-layer capacitor electrodes are discussed herein in the context of energy storage devices, those skilled in the art will identify that aspects and advantages described herein may apply to electrodes used in other energy storage devices, for example, batteries, fuel cells, and the like. Further in example, although an embodiment comprised of 100 micron and 115 micron active electrode films is described herein, it is understood that principles of the present invention encompass a much wider range of film thickness, which for purpose of minimizing duplicative disclosure have not been discussed in detail. Thus, in other embodiments, as found by points A and C on a CV curve, the above mentioned first ratio may be different from the particular ratios disclosed above. For example, in one embodiment, wherein an S-19 type activated carbon available from TDA Research at 12345 52 Ave., Wheat Ridge, Colo., 80033 was used, points A and C on a CV curve were found to be at about 0.75 volts and about 2.1 volts, respectively (i.e. an operating voltage of about 2.85 volts and a first ratio of about 0.35).

Therefore, this document describes in considerable detail the inventive methods for designing and fabricating electrodes and energy storage device using such electrodes. This has been done for illustration purposes only. Neither the specific embodiments of the invention as a whole, nor those of its features limit the general principles underlying the invention. In particular, the invention is not limited to the specific materials used in the illustrated embodiments. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function should be served by the claims presented herein and their equivalents.

We claim:

1. A double-layer capacitor, comprising:
    an electrolyte;
    a positive electrode layer of a first thickness, the positive electrode layer being immersed in the electrolyte; and
    a negative electrode layer of a second thickness, the negative electrode layer being immersed in the electrolyte;
    wherein:
        a first sub-capacitor is formed at an interface between the positive electrode layer and the electrolyte;
        a second sub-capacitor is formed at an interface between the negative electrode layer and the electrolyte; and
        the first and second thicknesses are selected by:
            determining a positive voltage limit for the first sub-capacitor and a negative voltage limit for the second sub-capacitor;
            dividing the positive voltage limit by the negative voltage limit to obtain a first ratio of the second sub-capacitor to the first sub-capacitor; and
            setting relative thicknesses of the positive electrode layer and the negative electrode layer so that capacitance of the second sub-capacitor is substantially equal to a product of the first ratio and the capacitance of the first sub-capacitor.

2. A double-layer capacitor in accordance with claim 1, wherein the relative thicknesses are set by:
    determining a first normalized sub-capacitance of the first sub-capacitor;
    determining a second normalized sub-capacitance of the second sub-capacitor;
    dividing the first normalized sub-capacitance by the second normalized sub-capacitance to obtain a specific proportionality constant; and
    choosing the relative thicknesses so that a ratio of thickness of the negative electrode layer to thickness of the positive electrode layer is substantially equal to a product of the first ratio end the specific proportionality constant.

3. A double-layer capacitor in accordance with claim 2, wherein the positive voltage limit and the negative voltage limit are determined by using an equidistant selection method.

4. A double-layer capacitor in accordance with claim 2, wherein the positive voltage limit and the negative voltage limit are determined by using an equal reliability selection method.

5. A double-layer capacitor in accordance with claim 2, wherein the positive voltage limit and the negative voltage limit are determined by using cyclic voltammetry measurements.

6. A double-layer capacitor in accordance with claim 2, wherein the first and second normalized sub-capacitances are determined by measuring.

7. A double-layer capacitor in accordance with claim 2, wherein:
    the first and second normalized sub-capacitances are determined by applying an analytical capacitance model to physical properties of the electrolyte and of material of the positive and negative electrode layers.

8. A double-layer capacitor in accordance with claim 7, wherein the physical properties used in the analytical model comprise sizes of cations and anions of the electrolyte.

9. A double-layer capacitor in accordance with claim 7, wherein the electrolyte comprises an aqueous electrolytic solution, and the physical properties used in the analytical model comprise sizes of cations and anions of the aqueous electrolytic solution.

10. A double-layer capacitor in accordance with claim 2, further comprising a positive current collector attached to the positive electrode layer, a negative current collector attached to the negative electrode layer, and a porous separator interposed between the positive electrode layer and the negative electrode layer to prevent direct electronic current flow between the positive electrode layer and the negative electrode layer, and to allow ionic current flow between the positive electrode layer and the negative electrode layer.

11. A double layer capacitor in accordance with claim 1, wherein the first ratio is less than or equal to about 0.47.

12. A double layer capacitor in accordance with claim 1, wherein the first ratio is less than or equal to about 0.47 and more than or equal to about 0.35.

13. A double layer capacitor in accordance with claim 1, wherein the electrode layers comprise dry fibrillized particles.

14. A double layer capacitor in accordance with claim 1, wherein a sum of the absolute values of the positive and the negative voltage limits is equal to or greater than about 2.5 volts.

* * * * *